United States Patent
Guo et al.

(10) Patent No.: US 7,805,288 B2
(45) Date of Patent: *Sep. 28, 2010

(54) CORPUS EXPANSION SYSTEM AND METHOD THEREOF

(75) Inventors: Hong Lei Guo, Beijing (CN); Zhi Li Guo, Beijing (CN); Zhao Ming Qiu, Beijing (CN); Li Qin Shen, Beijing (CN); Li Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/138,139

(22) Filed: Jun. 12, 2008

(65) Prior Publication Data

US 2008/0250015 A1      Oct. 9, 2008

Related U.S. Application Data

(63) Continuation of application No. 11/511,750, filed on Aug. 29, 2006.

(30) Foreign Application Priority Data

Sep. 29, 2005     (CN) .................. 2005 1 0108065

(51) Int. Cl.
G06F 17/20     (2006.01)
(52) U.S. Cl. .................. 704/1; 704/7; 704/4; 704/9
(58) Field of Classification Search .................. 704/1, 704/3, 7, 9, 10, 2, 257, 251, 4, 270; 707/104.1, 707/4, 104, 1, 661, 673
See application file for complete search history.

(56) References Cited

U.S. PATENT DOCUMENTS

| | | | |
|---|---|---|---|
| 5,926,811 | A | 7/1999 | Miller et al. |
| 5,999,927 | A | 12/1999 | Tukey et al. |
| 6,038,557 | A | 3/2000 | Silverstein |
| 6,101,492 | A | 8/2000 | Jacquemin et al. |

(Continued)

OTHER PUBLICATIONS

Susan Gauch et al., "A corpus analysis approach for automatic query expansion and its extension to multiple databases" ACM Transactions on Information Systems (TOIS), Jul. 1999, vol. 17 Issue 3 p. 250.

(Continued)

*Primary Examiner*—Huyen X. Vo
(74) *Attorney, Agent, or Firm*—Scully, Scott, Murphy & Presser, P.C.; Kenneth Corsello, Esq.

(57) ABSTRACT

A system and method for expanding new sample seeds to automatically expand corpora, in which sample seeds are used to collect corpus is provided. The new sample seeds are generated based on the already existed sample seeds and collected corpora; The corpus expansion strategy is determined based on all the sample seeds having been used and new sample seeds: The new sample seeds are refined based on the corpus expansion strategy, and the refined new sample seeds are used to further collect corpus. The above steps are repeatedly executed until predefined condition is satisfied. According to the invention, corpus may be automatically expanded from the web or other resources with low cost and in convenient way to improve the coverage of corpora.

21 Claims, 8 Drawing Sheets

U.S. PATENT DOCUMENTS

| | | | |
|---|---|---|---|
| 6,321,222 | B1 | 11/2001 | William Soderstrom et al. |
| 6,418,445 | B1 | 7/2002 | Moerbeek |
| 6,453,312 | B1 | 9/2002 | Goiffon et al. |
| 6,631,369 | B1 * | 10/2003 | Meyerzon et al. ............... 707/4 |
| 6,886,129 | B1 | 4/2005 | Raghavan et al. |
| 7,308,464 | B2 * | 12/2007 | Nowitz et al. ............ 707/104.1 |
| 2005/0044067 | A1 | 2/2005 | Jameson |
| 2005/0091198 | A1 | 4/2005 | Dettinger et al. |

OTHER PUBLICATIONS

Ellen M. Voorhees, "Query expansion using lexical-semantic relations" Proceedings of the 17th annual international ACM SIGIR conference on Research and development in information retrieval SIGIR 94 (Aug. 1994).

* cited by examiner

CORPUS EXPANSION SYSTEM AND METHOD THEREOF

RELATED APPLICATIONS

This application is a continuation of U.S. Ser. No. 11/511,750, filed Aug. 29, 2006, the entire contents of which are incorporated herein by reference.

FIELD OF THE INVENTION

The present invention relates to the field of information extraction, knowledge mining and other natural language processing applications, especially to a corpus expansion system and method for expanding corpus based on which the machine learning method is executed.

BACKGROUND OF THE INVENTION

Typically, the corpora collected manually or automatically are analyzed with the machine learning method to generate the classifier models of a certain specific class to be used in information extraction, knowledge mining and other natural language processing applications.

In the task-oriented or domain-oriented natural language processing applications, such as domain-specific information extraction and named entity recognition, collecting corpora with extensive coverage and tagging the collected corpora are the important factors for improving the recognition accuracy.

There exist some methods for automatically collecting and tagging corpus. In these methods, corpora are collected from the web or other resources by a search engine based on some sample seeds. However, in these existing methods, the corpus coverage is completely dependent on the limited initial sample seeds. Therefore, it is required to collect richer corpus based on more sample seeds.

SUMMARY OF THE INVENTION

To solve the problems mentioned above in the prior art, an object of the invention is to provide a system and method for automatically expanding corpus by expanding new sample seeds.

To obtain the above object, the present invention provides a corpus expansion system, comprising: a corpus collection unit, for collecting corpus using sample seeds; a sample seed expansion unit, for generating new sample seeds, based on the sample seeds having been used by the corpus collection unit and the collected corpora; a balancing unit, for determining a corpus expansion strategy based on all the sample seeds having been used by the corpus collection unit and the new sample seeds; a refining unit, for refining the new sample seeds based on the corpus expansion strategy.

The present invention further provides a corpus expansion method, comprising: collecting corpus using sample seeds; generating new sample seeds, based on the sample seeds having been used and the collected corpora; determining a corpus expansion strategy based on all the sample seeds having been used and the new sample seeds; refining the new sample seeds based on the corpus expansion strategy; repeating the above steps until a predefined condition reaches.

According to the invention, corpus can be automatically expanded from the web or other resources with low cost and in convenient way.

According to the invention, the coverage of corpus may be improved.

According to the invention, the quality of pre-tagging corpus may be improved by using the sample seeds automatically expanded in building the annotated corpus.

These and other advantages of the invention will be more apparent by the detailed description of the preferred embodiments of the invention, with reference to the accompanying drawings.

DETAILED DESCRIPTION OF THE PREFERRED EMBODIMENT

Figure 1:
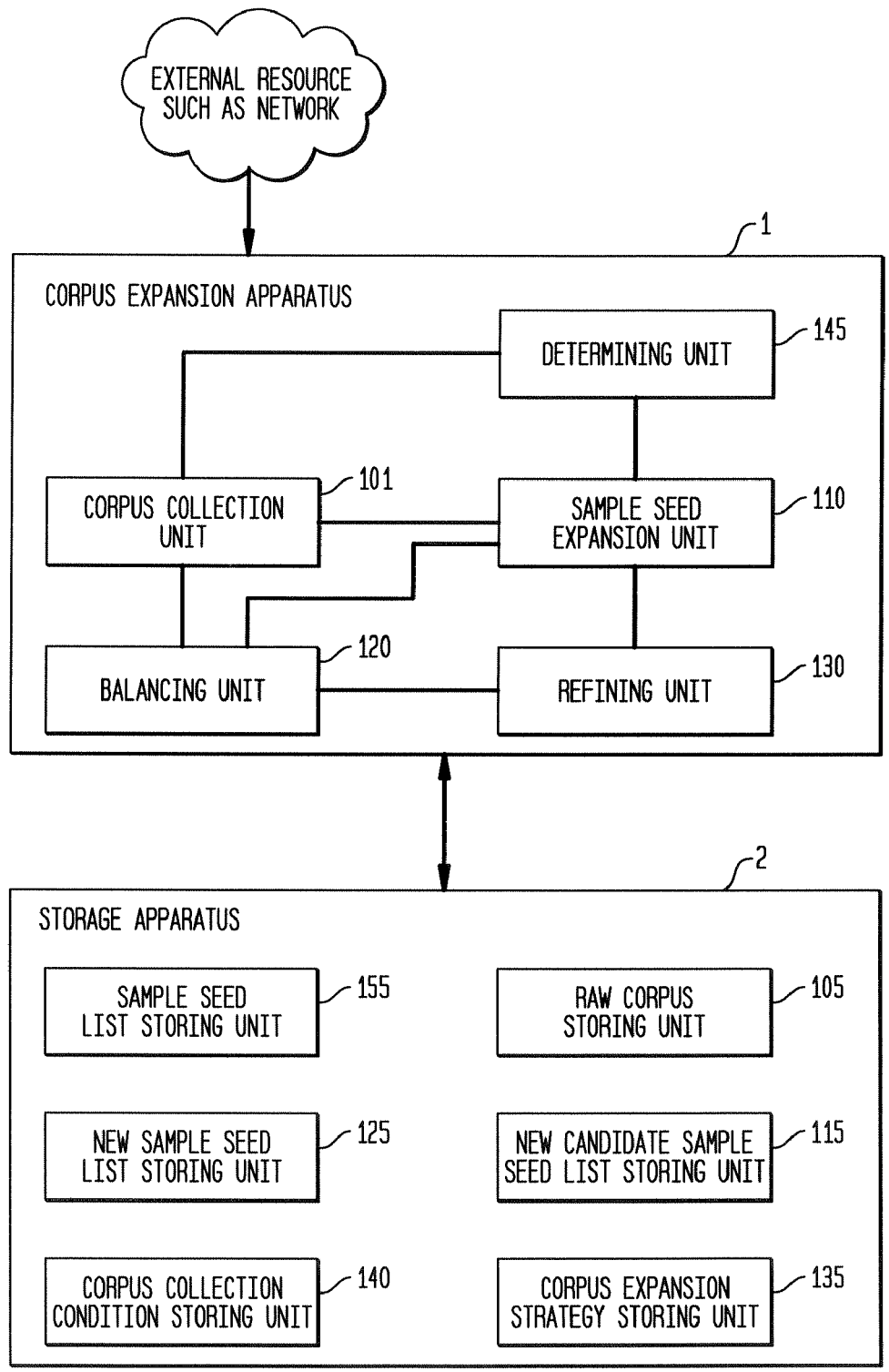
FIG. 1 shows the schematic block of the corpus expansion system according to the first embodiment of the invention.

The method and system according to the invention will be described with the named entity recognition as example. However, it will be apparent for the persons in the art that the method and system according to the invention can be applied to other similar fields such as nominal entity recognition, relationship recognition and information extraction.

The terms used in the invention will be explained first.

Specific field: the particular field where corpus is collected, such as financial field, sports field, and entertainment field.

Named entity class under specific field (hereinafter named as class): the class having practical meaning defined under the specific field when collecting corpus for the specific field. For example, the classes under the banking field are classified as bank name class, representative name class, city name class.

Named entity: a word sequence representing an entity name that has the practical meaning in each of the classes under specific class, such as specific bank name, person's name, place name.

Sample seed: the sample of named entity in specific field, for example, certain bank name, person's name, place name. the sample seed is used for searching resources when collecting corpus.

Corpus: a segment in a natural language including one or more sample seeds, such as an article or a snippet.

Raw corpus: corpus having not any annotation.

Corpus collection condition: the condition required when collecting corpus. Only the corpus satisfying the condition can be collected. For example, the condition includes the class such as the financial class, the sports class or other class; the document type such as WORD file, PDF file or other types; the language used by the corpus; the maximum number of the collected corpora; whether a corpus is a snippet or the whole document; the URL limitation on corpus.

Sample seed list: similar sample seeds in each of the classes under specific field are associatively stored. For example, several specific bank names in the bank class under financial field are similar sample seeds. These sample seeds compose one sample seed list with each record including the sample seed and the class the sample seed belongs to. According to the invention, the sample seed list consists of the sample seeds used when initially collecting corpus and the new sample seeds expanded according to the invention. That is, the sample seed list includes all the sample seeds ever used when collecting corpus.

New candidate sample seed list: the list including new sample seeds expanded according to the invention that have not been balanced and refined.

New sample seed list: the list including new sample seeds expanded according to the invention that have been balanced and refined. According to the invention, the new sample seeds in the new sample seed list are used for the resource searching when collecting corpus.

Corpus expansion strategy: the strategy used when expanding corpus for the corpora currently collected. For example, the strategy is the information about in which class under which field corpus need to be expanded; or the strategy is the information about which sample seed(s) need to be deleted from the collected new sample seeds.

The following description is based on the following assumption: corpus and the sample seeds are expanded for a certain field.

FIG. 1 shows the schematic block of the corpus expansion system according to the first embodiment of the invention. The corpus expansion system according to the invention in one embodiment comprises the corpus expansion apparatus 1 and the storage apparatus 2. The corpus expansion apparatus 1 comprises the corpus collection unit 101, the sample seed expansion unit 110, the balancing unit 120, the refining unit 130 and the determining unit 145. The storage apparatus 2 comprises the raw corpus storing unit 105, the new candidate sample seed list storing unit 115, the new sample seed list storing unit 125, the corpus expansion strategy storing unit 135, the corpus collection condition storing unit 140 and the sample seed list storing unit 155. The raw corpus storing unit 105 stores all the raw corpora collected by the corpus collection unit 101, that is, the corpora having not any annotation. The new candidate sample seed list storing unit 115 stores the new candidate sample seed list generated by the sample seed expansion unit 110.

The new sample seed list storing unit 125 stores the list of the new sample seeds obtained after the refining unit 130 refines the new candidate sample seeds. When the system is initiated, the new sample seed list storing unit 125 stores the sample seeds used when the corpus is collected at the first time. The corpus expansion strategy storing unit 135 stores the corpus expansion strategy generated by the balancing unit 120.

The corpus collection condition storing unit 140 stores the corpus collection condition. During the system initiation and the following corpus expansion operation, the corpus collection condition used in collecting corpus can be input manually. The sample seed list storing unit 155 stores the list of all the sample seeds expanded according to the invention. When the system is initiated, the sample seed list storing unit stores the sample seeds when corpus is initially collected. Every time the new sample seed is expanded, it is added to the sample seed list storing unit 155.

Figure 2:
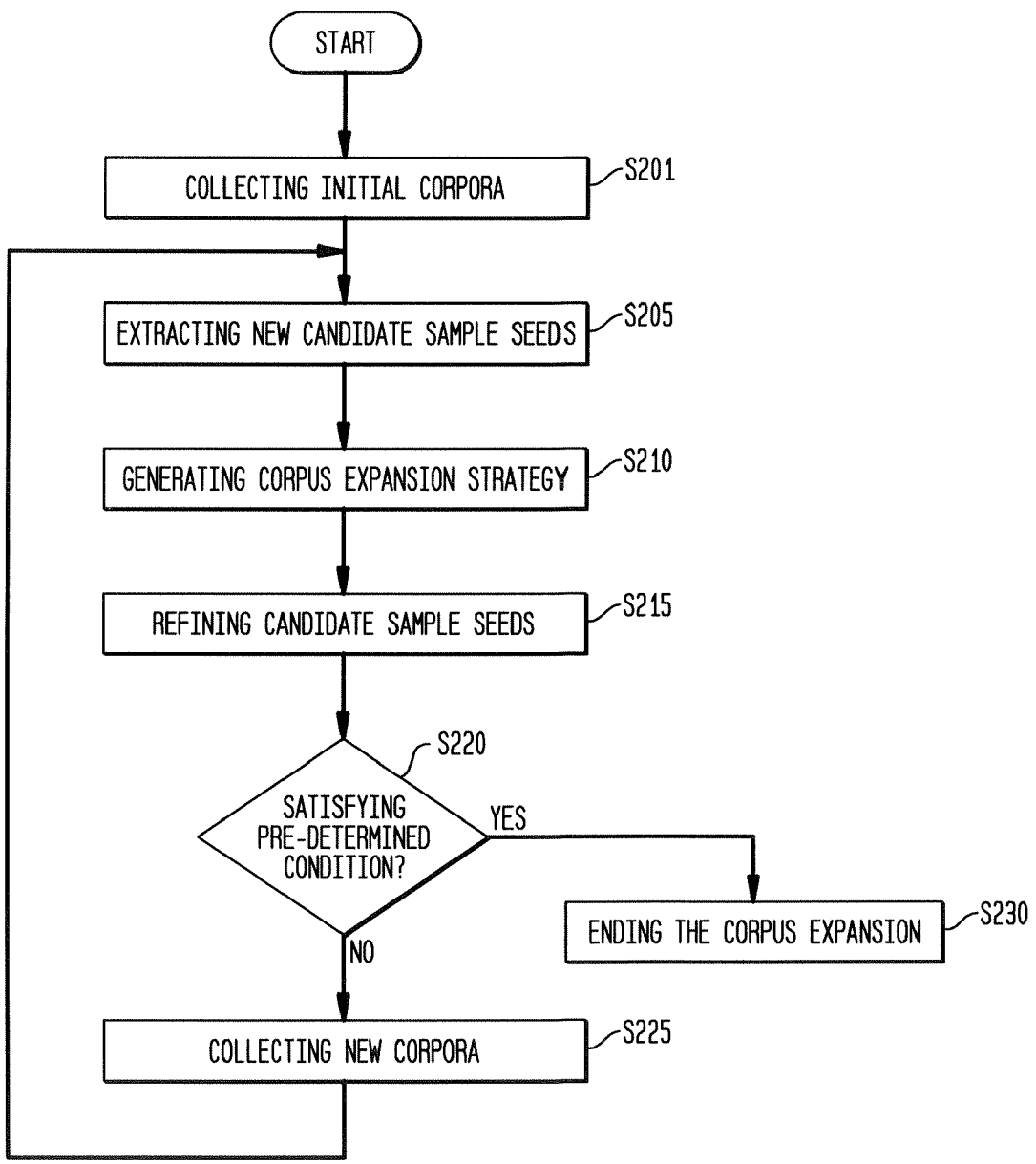
FIG. 2 shows the general flow chart of the corpus expansion process according to the first embodiment of the invention.

The function of the blocks of the corpus expansion system will be described by describing the corpus expansion process according to the invention. FIG. 2 shows the general flow chart of the corpus expansion process according to the invention. Firstly, in step S201, the corpus collection unit 101 collects the initial corpora from the web or other external resources by using known art, based on the initial sample seeds stored in the new sample seed list storing unit 125 and the corpus collection condition stored in the corpus collection condition storing unit 140, and stores the corpora into the raw corpus storing unit 105. In the collected raw corpora, the sample seeds are not tagged.

The method for collecting corpus may be as follows: the new sample seeds are used as the search keywords and submitted to the web search engine or other search system of external resource; the results are obtained after searching which include the storing address (e.g., URL) of the natural language snippets or articles including the keywords; the results are filtered based on the corpus collection condition; the natural language snippets or articles satisfying the condition are downloaded to the local system and stored in the raw corpus storing unit 105.

In step S205, the sample seed expansion unit 110 extracts the new candidate sample seeds from all the currently available raw corpora stored in the raw corpus storing unit 105, based on the later described method, and associates the extracted new candidate sample seeds with the corresponding class of specific field to generate a list and stores the list into the new candidate sample seed list storing unit 115.

In step S210, the balancing unit 120 analyzes the distribution of the sample seeds stored in the sample seed list storing unit 155 and the new candidate sample seed list storing unit 125, to generate the corpus expansion strategy, and stores the strategy into the corpus expansion strategy unit 135.

In step S215, the refining unit 130 refines the candidate sample seeds stored in the new candidate sample seed list storing unit 115, based on the corpus expansion strategy stored in the corpus expansion strategy storing unit 135, to generate the new sample seed list, stores the list into the new sample seed list storing unit 125, and adds the new sample seeds into the sample seed list storing unit 155.

In step S220, the determining unit 145 determines whether the predefined corpus collection end condition is satisfied. When the condition is satisfied, it proceeds to the step S230 where the corpus collection unit stops the expansion of corpus. Otherwise, it proceeds to the step S225. The predefined condition, for example, is when the sample seed expansion unit 110 does not expand any new sample seeds, or when the ratio of the number of new sample seeds to the number of the sample seeds in expanding corpus last time is less than a specific value, or when the number of the raw corpora stored in the raw corpus storing unit 105 reaches to a certain value.

In step S225, the corpus collection unit 101 collects the new corpora based on the expanded new sample seeds stored in the new sample seed list storing unit 125 and the corpus collection condition stored in the corpus collection condition storing unit 140, combines the collected new corpora and the raw corpora stored in the corpus storing unit 105 and stores the combined ones into the corpus storing unit 105.

And then it returns to the step S205 to continue the process.

The process of the sample seed expansion unit 110 will be described now.

Figure 3:
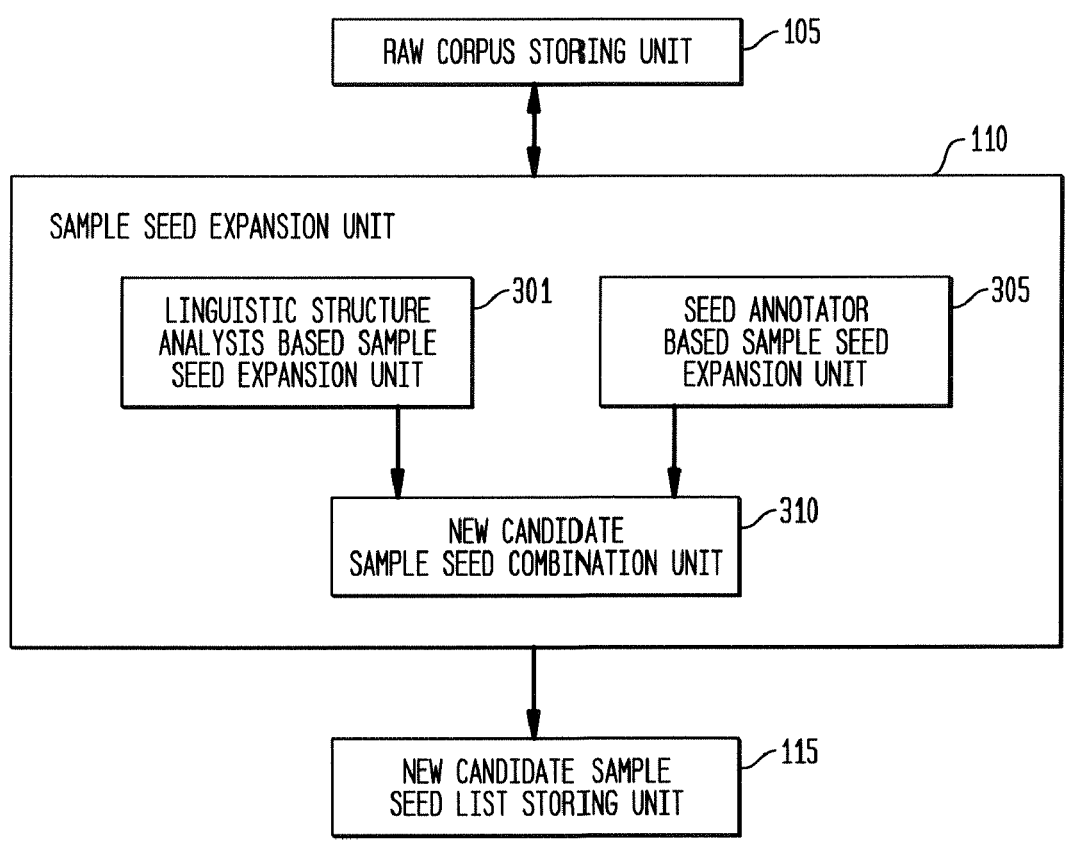
FIG. 3 shows the structural block of the sample seed expansion unit according to the first embodiment of the invention.

FIG. 3 shows the structure of the sample seed expansion unit 110.

In FIG. 3, the parts which are the same as FIG. 1 have the same reference numerals as FIG. 1. The sample seed expansion unit 110 comprises the linguistic structure analysis based sample seed expansion unit 301, the seed annotator based sample seed expansion unit 305 and the new candidate sample seed combination unit 310.

Figure 4:
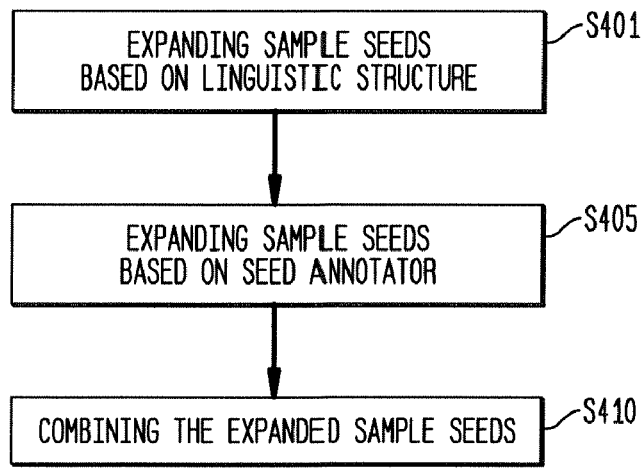
FIG. 4 shows the flow chart of the sample seed expansion process according to the first embodiment of the invention.

FIG. 4 shows the process of sample seed expansion according to the sample seed expansion unit 110 of the invention. In step 401, the linguistic structure analysis based sample seed expansion unit 301 expands to generate new candidate sample seeds, and provides the generated new candidate sample seeds to the new candidate sample seed combination unit 310. In step 405, the seed annotator based sample seed expansion unit 305 expands to generate new candidate sample seeds, and provides the generated new candidate sample seeds to the new candidate sample seed combination unit 310. In step S410, the new candidate sample seed combination unit 310 combines the new candidate sample seeds generated in the step S401 and the step S405 to generate the new candidate sample seed list and store the new candidate sample seed list into the new candidate sample seed list storing unit 115.

Taking a raw corpus as an example, the process procedure of the linguistic structure analysis based sample seed expansion unit 301 will be described now.

Figure 5:
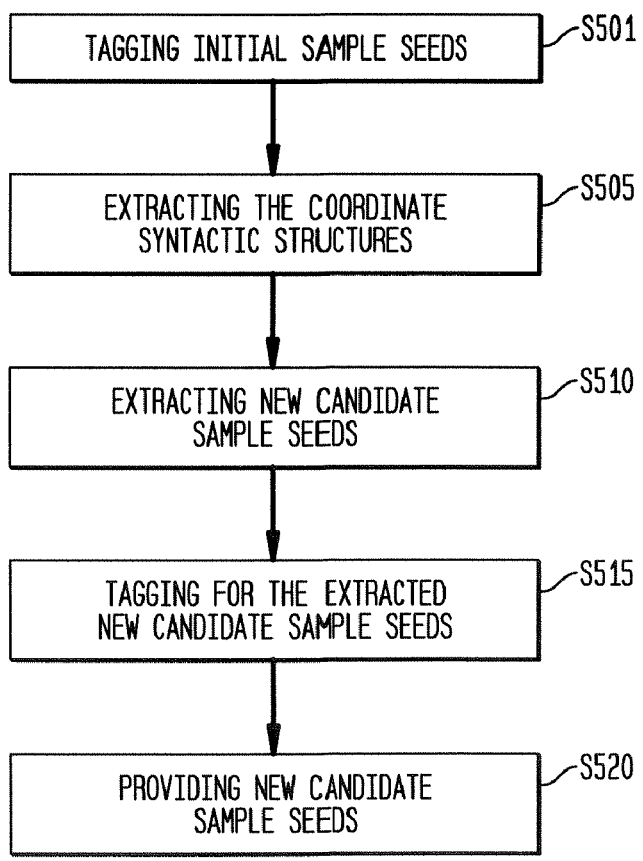
FIG. 5 shows the flow chart of the sample seed expansion process based on linguistic structure analysis according to the first embodiment of the invention.

In FIG. 5, in step S501, the initial sample seeds are tagged by tags for all the collected raw corpora having not been tagged in the raw corpus storing unit 105. The initial sample seeds are the sample seeds stored in the sample seed list storing unit 155. The tagged corpora are stored in a storing unit not shown.

In step S505, all the coordinate syntactic structures which contain the initial sample seeds are extracted from the tagged corpora using the known linguistic rule database. For example, the coordinate syntactic structures with the conjunction words such as "and", "such as", "etc." or punctuations are extracted from the sentences in the corpora based on the coordinate syntactic rules. The coordinate syntactic structure, for example, is a snippet including initial sample seed(s) and some content on the left and the right of the initial sample seed(s).

In Step S510, all the new candidate sample seeds are extracted from the extracted coordinate syntactic structures. In step S515, the new candidate sample seeds extracted from the tagged corpora are further tagged by using the same tags as that of the initial sample seeds in the extracted coordinate syntactic structures. In step S520, the extracted new candidate sample seeds are provided to the new candidate sample seed combination unit 310.

Figure 6:
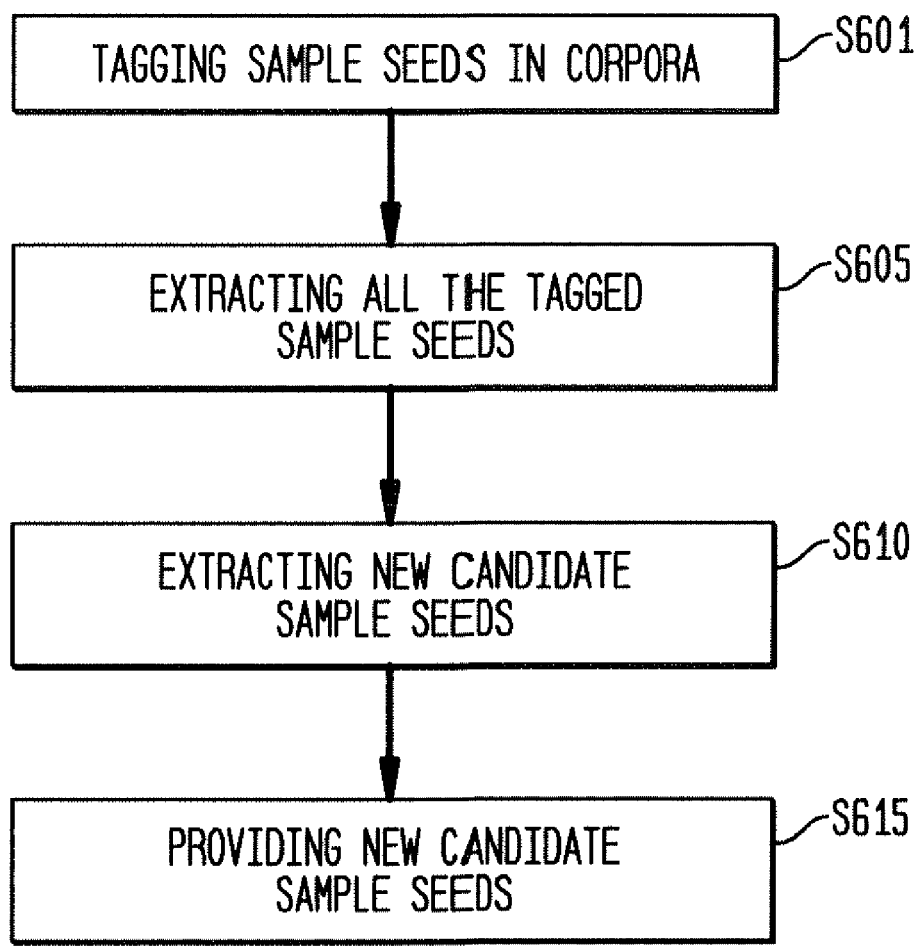
FIG. 6 shows the flow chart of the sample seed expansion process based on the available seed annotators according to the first embodiment of the invention.

The process procedure of the seed annotator based sample seed expansion unit 305 will be described now. As shown in FIG. 6, in step S601, all the raw corpora collected by the corpora collection unit 101 are automatically tagged by using a seed annotator to tag the sample seeds. The tagged corpora are stored in a storing unit not shown.

The seed annotation may be an independent known means which can automatically tag entities appeared in a raw corpus, or be a seed annotator obtained through machine learning based on the currently collected corpora. In the later case, the step S601 executes the following process: firstly, the initial sample seeds in the raw corpora not tagged in the raw corpus storing unit 105 are tagged by tags, in which the initial sample seeds are the sample seeds stored in the sample seed list storing unit 155; then, the tagged corpora are supplied to the known machine learning module to train a seed annotator; lastly, the entity annotator obtained after training is used to recognize the raw corpora to get the corpora being tagged.

In step S605, the tagged sample seeds are extracted from the automatically tagged corpora. In step S610, the sample seeds except those in the sample seed list storing unit 155 are extracted from the extracted tagged sample seeds, as the new candidate sample seeds. It will be apparent for the persons in the art that the recognition result of the above seed annotator will be different from the sample seeds stored in the sample seed list storing unit 155. In step S615, the extracted new candidate sample seeds are provided to the new candidate sample seed combination unit 310. The sample seeds may be effectively expanded through the process of the above FIGS. 4 to 6.

The operations of refining the new candidate sample seeds and refining the corpus expansion strategy according to the invention will be described. The imbalanced corpus will bring many difficulties to machine learning, such as decreasing the performance and accuracy of the classification. The balancing unit 120 and the refining unit 130 are used to implement the sample seed evaluation, and provide the corpus expansion strategy based on the distribution of the sample seeds to refine the new sample seeds.

Figure 7:
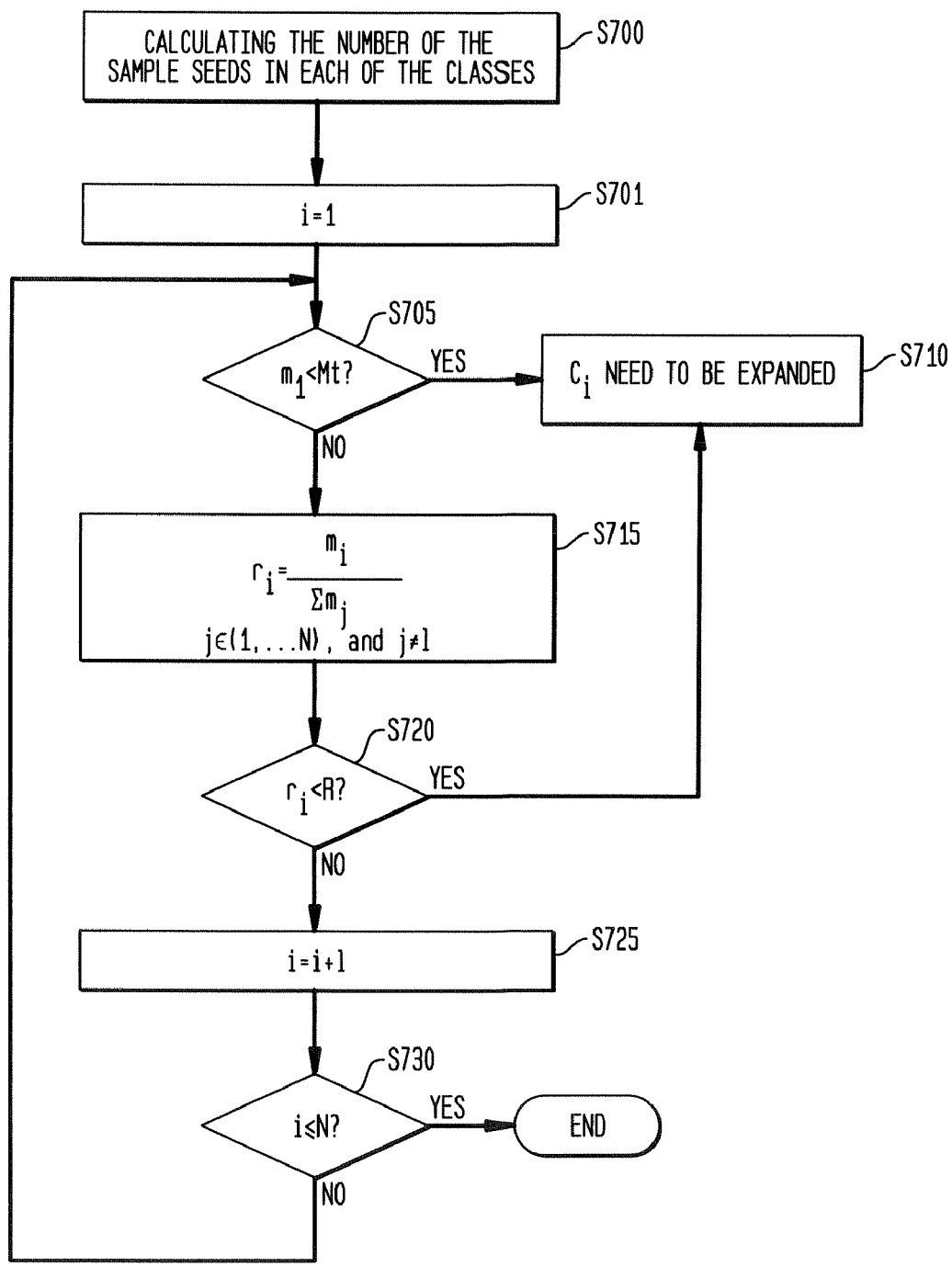
FIG. 7 shows the flow chart of determining whether to expand sample seeds for a class according to the first embodiment of the invention.

FIG. 7 shows the flow chart of determining whether to expand the sample seeds in a certain class according to the balancing unit 120 of the invention. Assuming there are N classes $\{C_1, C_2, \ldots, C_n\}$ of entities; the number of the sample seeds in these classes are $\{m_1, m_2, \ldots, m_n\}$; the threshold $M_t$ represents the allowed minimum sample seeds number in a certain class; $r_i$ ($1 \leq i \leq n$) represents the ratio of the number of the sample seeds in each of the classes to the sum of the number of the sample seeds in each of the other classes; the threshold R represents the value that the ratio needs to reach.

Firstly, in step S700, the number $\{m_1, m_2, \ldots, m_n\}$ of the sample seeds in each of the classes $\{C_1, C_2, \ldots, C_n\}$ in specific field are counted, based on the sample seeds stored in the sample seed list storing unit 155 and the new candidate sample seeds stored in the new candidate sample seed list storing unit 115.

In step S701, i is set to 1.

In step S705, it is determined if $m_i \leq M_t$ is satisfied

When satisfied, it proceeds to the step S710, the information about the sample seeds in $C_i$ class need to be expanded is stored in the corpus expansion storing unit 135 as a class expansion strategy.

When not satisfied, it proceeds to the step S715, setting $$r_i = \frac{m_i}{\sum_{j \in (1, \ldots N) \text{ and } j \neq i} m_j}$$

In step S720, it determines whether the $r_i < R$ is satisfied. When satisfied, it proceeds to the step S710, the information about the sample seeds in $C_i$ class need to be expanded is stored in the corpus expansion storing unit 135 as a class expansion strategy.

When not satisfied, it proceeds to the step S725, setting i=i+1.

In step S730, it determines whether the $i \geq N$ is satisfied. When satisfied, the process ends.

Otherwise, it returns to the step S705 to continue the balancing process of the next class.

Through the above operation, the information about in which class the sample seeds need to be expanded is stored in the corpus expansion storing unit 135, for being used when refining the candidate sample seeds.

However, the problem of the decreasing of the performance of the machine learning can not be sufficiently solved by storing the information about in which class the sample seeds need to be expanded, because the new candidate sample seeds expanded in one class may be overlapped with the sample seeds in other class in feature space. Then the invention further refines the new candidate sample seeds in the class which is needed to be expanded so as to get the new sample seeds used when collecting corpus next time.

Assuming there are N classes $\{C_1, C_2, \ldots, C_n\}$ of entities; the number of the sample seeds in these classes are $\{m_1, m_2, \ldots, m_n\}$. And assuming it is found the class $C_k$ need to be expanded through the method in FIG. 7.

Figure 8:
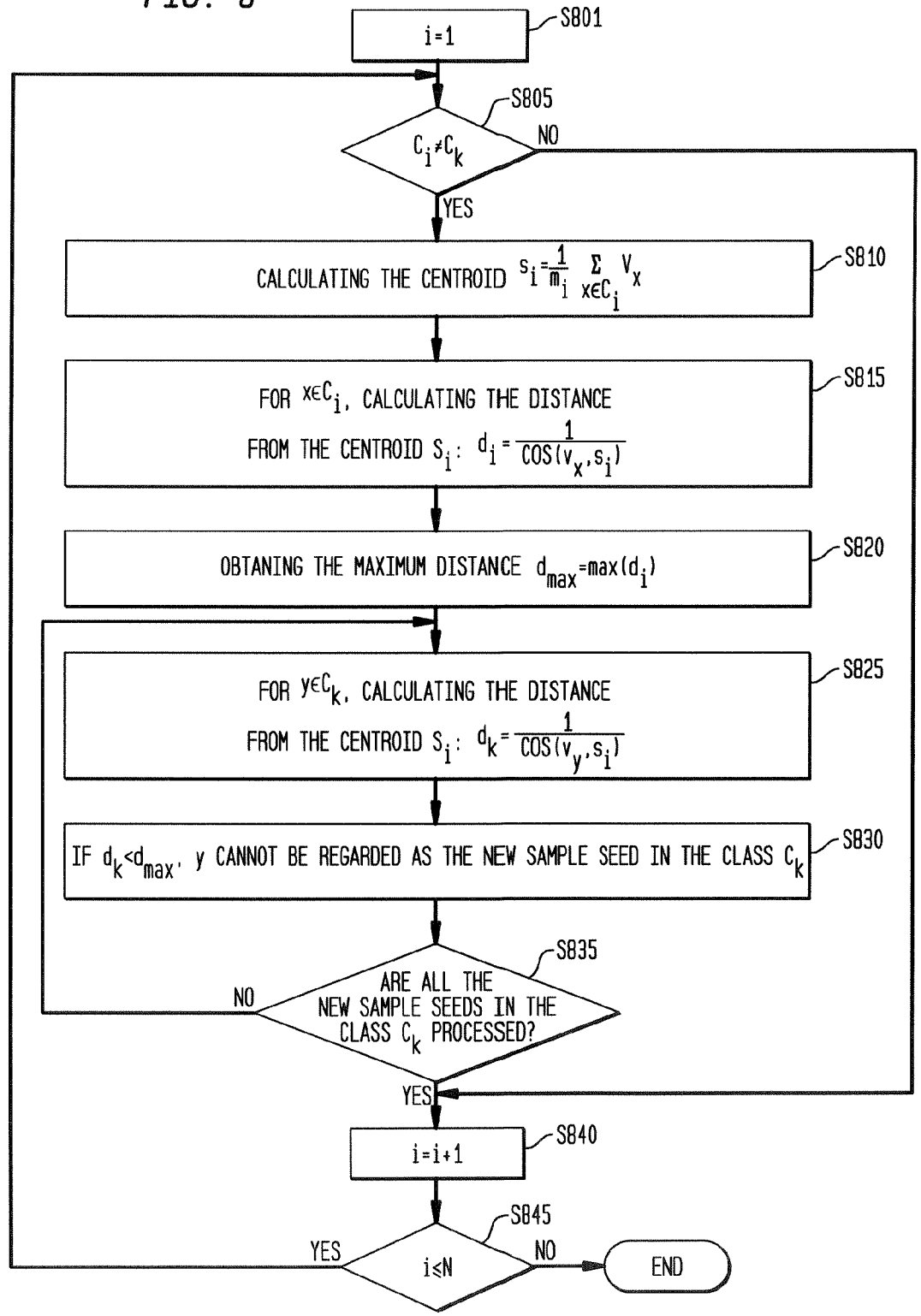
FIG. 8 shows the flow chart of determining the candidate sample seeds need to be deleted according to the first embodiment of the invention.

Through the process of FIG. 8, the information about which candidate sample seeds need to be deleted is obtained. As shown in FIG. 8, in step S801, i is set as 1.

In step S805, it is determined whether $C_i$ is not equal to $C_k$. When the two values equals to each other, it proceeds to the step S804. Otherwise, it proceeds to the step S810.

In step S810, the centroid $S_i$ of the sample seeds in the class $C_i$ stored in the sample seed list storing unit 155 is computed based on the formula:

$$S_i = \frac{1}{m_i} \sum_{x \in C_i} V_x$$

where, x represents each of the existed sample seeds in the class $C_i$, $V_x$ represents the feature vector of the sample seed x. Then, in step S815, calculate the distance between each of the sample seeds x and $S_i$:

$$d_i = \frac{1}{\cos(V_x, S_i)}$$

In step S820, the maximum distance $d_{max}$ is obtained based on the calculated $d_i$, that is, $d_{max} = \max(d_i)$ In step S825, setting y is the new candidate sample seed in the class $C_k$, $V_y$ represents the feature vector value of the sample seed y. The distance between y and $S_i$ is calculated using $$d_k = \frac{1}{\cos(V_y, S_i)}$$

In step S830, $d_k$ is compared to $d_{max}$, when $d_k < d_{max}$, it is determined y is the new candidate sample need to be deleted from the new candidated sample seeds in the class $C_k$, and stores the information the new candidate sample seed need to be deleted as a new sample seed expansion strategy into the corpus expansion storing unit 135.

In step S835, it determined whether all the new candidate sample seeds in the class $C_k$ are processed. If not processed, it returns to the step S825. the step S825 and S830 are repeatedly executed until all the new candidate sample seeds in the class $C_k$ are processed.

When all the new candidate sample seeds are processed, it proceeds to the step S840 to set i=i+1.

In step S845, it determines whether the $i \leq N$ is satisfied. When satisfied, it returns to the step S805 to continue balance the new candidate sample seeds in the next class $C_i$ to be expanded.

Otherwise, the process ends.

For the classes which need to be expanded stored in the corpus expansion strategy storing unit 135 through the process in FIG. 7, the process in FIG. 8 are respectively processed so as to determine which new candidate sample seeds cannot be used as new sample seeds for each of the class $C_k$ that need to be expanded.

Figure 9:
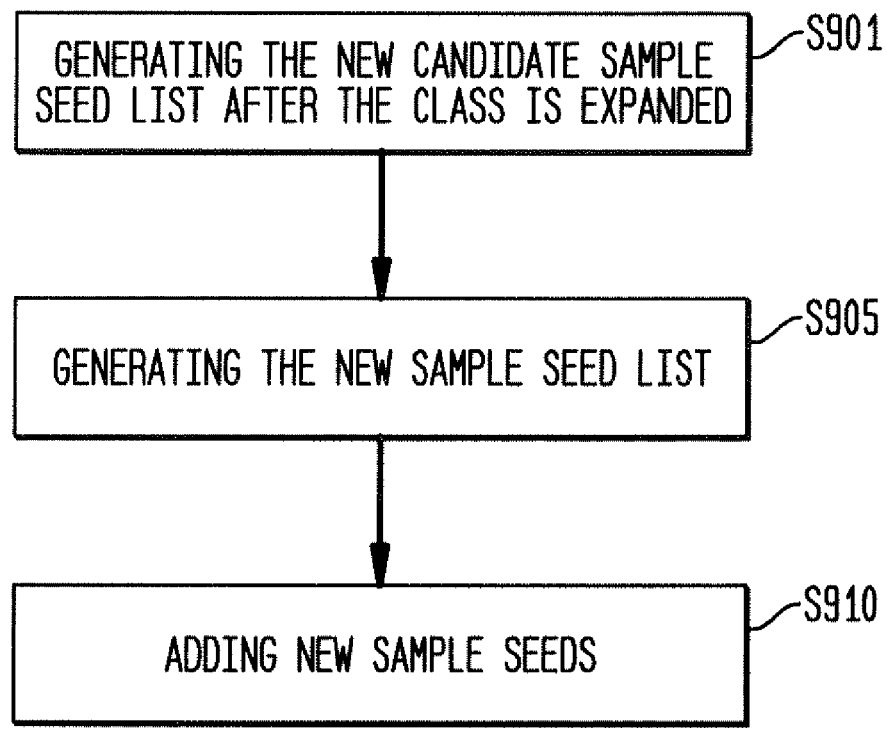
FIG. 9 shows the flow chart of refining the sample seed according to the first embodiment of the invention.

FIG. 9 shows the operation procedure of the refining unit 130 which refines the new sample seeds based on the new sample seeds expansion strategy stored in the corpus expansion strategy storing unit 135 according to the process of FIGS. 7 and 8.

Firstly, in step S901, the refining unit 130 deletes the new candidate sample seeds of the classes that does not need to be expanded from the new candidate sample seed list storing unit, based on the class expansion strategies stored in the corpus expansion strategy storing unit 135, to generate the new candidate sample seed list after class expansion. In step S905, the refining unit 130 deletes the new candidate sample seeds chosen in FIG. 8 from the new candidate sample seed list, to generate the new sample seed list.

In step S910, the new sample seed list is stored in the new sample seed list storing unit 125, the new sample seeds in the new sample seed list is added into the sample seed list storing unit 155.

In addition, the contents in the new candidate sample seed list storing unit 115 are deleted to store the new candidate sample seeds to be used when collecting corpus next time. The contents in the corpus expansion strategy storing unit 135 are deleted to be used when generating the new corpus expansion strategies.

In addition, as to the new sample seed list storing unit 125, the contents thereof are deleted each time after the corpus collection unit 101 collects corpora.

In addition, as to the contents in the corpus collection condition storing unit 140, an input device not shown may be used to manually adjust which corpus collection condition could be remained to be used when collecting corpus, each time before the corpus collection unit 101 collects corpus.

Through the above processes, both the sample seeds and corpora are expanded.

OTHER EMBODIMENTS

In the above embodiment, the (new) candidate sample seed list storing unit and the corpus expansion strategy storing unit are used as temporal storing unit to store the temporal data. It will be apparent for the persons in the art to omit these temporal storing means by directly transferring the temporal data from previous processing unit to the corresponding next processing unit. In addition, The expanded sample seeds stored in the sample seed list storing unit 155 are used in information extraction, knowledge mining or other natural language processing applications.

Further, the expanded sample seeds stored in the sample seed list storing unit 155 may be used by known sample seed annotator to pre-tag the raw corpora stored in the raw corpora storing unit 105, or pre-tag the corpora from other sources, so as to improve the annotation performance of pre-tagging. Further, the tagged corpora may be stored for using in information extraction, knowledge mining or other natural language processing applications.

In addition, the corpus expansion apparatus according to the invention can be implemented by running a program by a processor, or by a logic circuit, or the combination of program and logic circuit. In addition, the storing unit according to the invention can be implemented by a readable RAM or any other known storage means.

In addition, the above operation process can be implemented in the manner of program executable by computer stored in different medium, e.g., a computer-readable medium, or by being download from communication network and being executed by computer. The medium for providing the program comprises for example, memory or memory unit, semiconductor, disk unit such as optical disk, magnetic disk and magneto-optic disk or any other medium suitable for storing information.

The present invention may have a plurality of varied embodiments within the spirit and scope of the invention. Therefore, it will be appreciated that, the scope of protection of the invention is defined by the following claims, but not limited to the specific embodiments.

While the embodiments of the invention have been described in detail with reference to attached drawings, various changes and modifications may be made to the above embodiments without departing from the spirit and scope of the invention. Therefore, the scope of the invention is only defined by the attached claims.

We claim:

1. A corpus expansion system, comprising:
a corpus collection unit, for collecting corpus using sample seeds;
a sample seed expansion unit, for generating new sample seeds, based on the sample seeds having been used by the corpus collection unit and the collected corpora;
a balancing unit, for determining a corpus expansion strategy based on all the sample seeds having been used by the corpus collection unit and the new sample seeds; and
a refining unit, for refining the new sample seeds based on the corpus expansion strategy;
wherein said corpus expansion strategy includes at least one of the information about the class in specific field in which the sample seeds need to be expanded and the information about which sample seed needs to be deleted in said new sample seeds, wherein said refining unit refines the new sample seeds based on at least one of the information about the class in specific field in which the sample seeds need to be expanded and the information about which sample seed needs to be deleted in said new sample seeds.

2. The corpus expansion system according to claim 1, further comprising a
sample seed storing unit for storing all the sample seeds having been used by the corpus collection unit, wherein said corpus collection unit uses the refined new sample seeds to collect corpus and
said refining unit adds the refined new sample seeds into the sample seed storing unit.

3. The corpus expansion system according to claim 1, wherein,
said sample seed expansion unit comprises at least one of:
a linguistic structure analysis based sample seed expansion unit for generating new sample seeds based on linguistic structure features and
a seed annotator based sample seed expansion unit for generating new sample seeds based on known seed annotator.

4. The corpus expansion system according to claim 3, further comprising a corpus storing unit for storing the corpora collected by the corpus collection unit.

5. The corpus expansion system according to claim 4, wherein,
the predefined condition is when the number of corpora reaches a selected value, or when the ratio of the number of new sample seeds to the number of the sample seeds when expanding corpus last time is less than a specific value, or combination thereof.

6. The corpus expansion system according to claim 3, wherein,
the corpus collection unit stops collecting corpus when a predefined condition is reached.

7. The system of claim 1, wherein determining a corpus expansion strategy includes:
determining whether $r_i < R$ is satisfied, wherein $$r_i = \frac{m_i}{\sum_{j \in (1, \ldots N) \text{ and } j \neq i} m_j},$$

$m_i$, is the number of the sample seeds in each class $C_i$.

8. The system of claim 1, wherein determining a corpus expansion strategy includes:
determining a centroid $S_i$ of sample seeds in class $C_i$, wherein $$S_i = \frac{1}{m_i} \sum_{x \in C_i} V_x,$$

x represents each of existing sample seeds in the class $C_i$, $V_x$ represents a feature vector of sample seed x;
determining a distance $d_i$ between each of the sample seeds x and $S_i$, wherein $$d_i = \frac{1}{\cos(V_x, S_i)},$$

determining maximum distance $d_{max}$ based on the distance $d_i$, wherein
$d_{max} = \max(d_i)$;
setting y as a new candidate sample seed in class $C_k$, wherein $V_y$ represents a feature vector value of the sample seed y;
determining a distance $d_k$ between the sample seed y and $S_i$, wherein $$d_k = \frac{1}{\cos(V_y, S_i)};$$

comparing $d_k$ to $d_{max}$; and
in response to determining $d_k$ is less than $d_{max}$, setting the sample seed y to be a new candidate sample seed to be deleted.

9. A corpus expansion method, comprising:
collecting corpus using sample seeds by a corpus expansion apparatus;
generating new sample seeds by the corpus expansion apparatus, based on the sample seeds having been used and the collected corpora;
determining, by a processor, a corpus expansion strategy based on all the sample seeds having been used and the new sample seeds;
refining the new sample seeds based on the corpus expansion strategy; and
repeating the above steps until a predefined condition is reached;
wherein said corpus expansion strategy includes at least one of the information about the class in specific field in which the sample seeds need to be expanded and the information about which sample seed needs to be deleted in said new sample seeds, wherein said refining step refines the new sample seeds based on at least one of the information about the class in specific field in which the sample seeds need to be expanded and the information about which sample seed needs to be deleted in said new sample seeds.

10. The corpus expansion method according to claim 9, further including storing all the sample seeds having been used when collecting corpus.

11. The corpus expansion method according to claim 9, wherein, the step of generating new sample seeds comprises at least one of generating new sample seeds based on linguistic structure features and generating new sample seeds based on known seed annotator.

12. The corpus expansion method according to claim 11, further comprising storing the collected corpora.

13. The corpus expansion method according to claim 12, wherein, the predefined condition is when the number of corpora reaches a certain value, or when the ratio of the number of new sample seeds to the number of the sample seeds when expanding corpus last time is less than a specific value.

14. A non-transitory computer-readable medium storing a program implementing method executable by computer, the method comprising:

collecting corpus using sample seeds by a corpus expansion apparatus;

generating new sample seeds by the corpus expansion apparatus, based on the sample seeds having been used and the collected corpora;

determining a corpus expansion strategy based on all the sample seeds having been used and the new sample seeds;

refining the new sample seeds based on the corpus expansion strategy; and repeating the above steps until a predefined condition is reached;

wherein said corpus expansion strategy includes at least one of the information about the class in specific field in which the sample seeds need to be expanded and the information about which sample seed need to be deleted in said new sample seeds, wherein said refining step refines the new sample seeds based on at least one of the information about the class in specific field in which the sample seeds need to be expanded and the information about which sample seed need to be deleted in said new sample seeds.

15. The computer-readable medium of claim 14, further including:

storing all the sample seeds having been used when collecting corpus.

16. The computer-readable medium of claim 14, wherein, the step of generating new sample seeds comprises at least one of generating new sample seeds based on linguistic structure features and generating new sample seeds based on known seed annotator.

17. The computer-readable medium of claim 14, further comprising storing the collected corpora.

18. A computer-implemented corpus expansion method, comprising:

collecting corpus using sample seeds by a corpus expansion apparatus, the sample seeds being samples of named entity in specific fields and the corpus being a segment in a natural language including one or more sample seeds;

generating new sample seeds by the corpus expansion apparatus, based on the sample seeds having been used and the collected corpora, said generating new sample seeds comprising at least generating new sample seeds based on linguistic structure features and known seed annotator;

determining, by a processor, a corpus expansion strategy based on all the sample seeds having been used and the new sample seeds, said corpus expansion strategy including at least information about a class in specific field in which the sample seeds need to be expanded and information about which sample seed need to be deleted in said new sample seeds;

refining the new sample seeds based on the corpus expansion strategy and the information about a class in specific field in which the sample seeds need to be expanded and the information about which sample seed need to be deleted in said new sample seeds;

repeating the above steps until a predefined condition reaches, the predefined condition being met when the number of corpora reaches a certain value, or when ratio of the number of new sample seeds to the number of the sample seeds when expanding corpus last time is less than a specific value;

storing all the sample seeds having been used when collecting corpus; and storing the collected corpora.

19. The method of claim 18, wherein determining a corpus expansion strategy includes:

determining whether $r_i < R$ is satisfied, wherein $$r_i = \frac{m_i}{\sum_{j \in (1, \ldots N) \text{ and } j \neq i} m_j},$$

$m_i$ is the number of the sample seeds in each class $C_i$.

20. The method of claim 18, wherein determining a corpus expansion strategy further includes:

determining a centroid $S_i$ of sample seeds in class $C_i$, wherein $$S_i = \frac{1}{m_i} \sum_{x \in C_i} V_x,$$

x represents each of existing sample seeds in the class $C_i$.

$V_x$ represents a feature vector of sample seed x;

determining a distance $d_i$ between each of the sample seeds x and $S_i$, wherein $$d_i = \frac{1}{\cos(V_x, S_i)},$$

determining maximum distance $d_{max}$ based on the distance $d_i$, wherein $d_{max} = \max(d_i)$;

setting y as a new candidate sample seed in class $C_k$, wherein $V_y$ represents a feature vector value of the sample seed y;

determining a distance $d_k$ between the sample seed y and $S_i$, wherein $$d_k = \frac{1}{\cos(V_y, S_i)};$$

comparing $d_k$ to $d_{max}$; and in response to determining $d_k$ is less than $d_{max}$, setting the sample seed y to be a new candidate sample seed to be deleted.

21. A corpus expansion system, comprising:

a corpus collection unit, for collecting corpus using sample seeds;

a sample seed expansion unit, for generating new sample seeds, based on the sample seeds having been used by the corpus collection unit and the collected corpora;

a balancing unit, for determining a corpus expansion strategy for expanding the collected corpus, based on all the sample seeds having been used by the corpus collection unit and the new sample seeds, wherein said corpus expansion strategy includes at least one of the information about the class in specific field in which the sample seeds need to be expanded and the information about which sample seed needs to be deleted in said new sample seeds, wherein the new sample seeds are refined based on at least one of the information about the class in specific field in which the sample seeds need to be expanded and the information about which sample seed needs to be deleted in said new sample seeds.

* * * * *